(12) United States Patent
Smith et al.

(10) Patent No.: US 10,247,536 B2
(45) Date of Patent: Apr. 2, 2019

(54) DIFFERENTIAL COMPENSATOR TO REDUCE UNCERTAINTY IN DETERMINATION OF MOVEMENT OF A STRUCTURAL MEMBER

(71) Applicant: THE UNITED STATES OF AMERICA, AS REPRESENTED BY THE SECRETARY OF COMMERCE, Washington, DC (US)

(72) Inventors: Christopher M. Smith, Washington, DC (US); Matthew S. Hoehler, Poolesville, MD (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 343 days.

(21) Appl. No.: 15/373,221

(22) Filed: Dec. 8, 2016

(65) Prior Publication Data
US 2017/0199021 A1    Jul. 13, 2017

Related U.S. Application Data

(60) Provisional application No. 62/275,937, filed on Jan. 7, 2016.

(51) Int. Cl.
*G01B 7/00*   (2006.01)
*G01B 7/16*   (2006.01)

(52) U.S. Cl.
CPC ............... *G01B 7/16* (2013.01); *G01B 7/003* (2013.01)

(58) Field of Classification Search
CPC ........................ G02B 26/06; G02B 26/0825; G02B 26/0841; G02B 3/0043; G02B 3/005; G02B 3/0056; G02B 3/0068; G01B 5/0014; G01B 5/043; G01B 7/003; G01B 7/16
See application file for complete search history.

(56) References Cited

U.S. PATENT DOCUMENTS

| 4,630,247 | A | * | 12/1986 | Rozycki | ................. G01V 1/155 |
| | | | | | 181/114 |
| 5,236,144 | A | | 8/1993 | Kautz | |
| 5,761,822 | A | | 6/1998 | Steinich | |
| 6,154,975 | A | | 12/2000 | Steinich | |
| 6,347,462 | B1 | | 2/2002 | Steinich | |

(Continued)

*Primary Examiner* — Yaritza Guadalupe
(74) *Attorney, Agent, or Firm* — Office of Chief Counsel for National Institute of Standards and Technology

(57) ABSTRACT

A differential compensator reduces uncertainty in determination of movement of a structural member and includes: a first probe line to attach to the structural member and to provide a first combination of displacement of the structural member and a first expansion of the first probe line in response to movement of the structural member and expansion of the first probe line; and a second probe line having a coefficient of thermal expansion that is different than that of the first probe line, the second probe line to attach to the structural member at a position on the structural member proximate to a point of attachment of the first probe line to the structural member and to provide a second combination of displacement of the structural member and second expansion of the second probe line in response to movement of the structural member and expansion of the second probe line.

20 Claims, 14 Drawing Sheets

(56) References Cited

U.S. PATENT DOCUMENTS

| | | |
|---|---|---|
| 6,609,309 B2 | 8/2003 | Shibuya |
| 2008/0141548 A1 | 6/2008 | Birchinger |
| 2011/0123374 A1* | 5/2011 | Albers .................. E21B 43/128 417/414 |
| 2017/0199021 A1* | 7/2017 | Smith ..................... G01B 7/003 |
| 2017/0199091 A1* | 7/2017 | Smith ................. G01M 99/002 |

* cited by examiner

DIFFERENTIAL COMPENSATOR TO REDUCE UNCERTAINTY IN DETERMINATION OF MOVEMENT OF A STRUCTURAL MEMBER

CROSS REFERENCE TO RELATED APPLICATIONS

This application claims the benefit of U.S. Provisional Patent Application Ser. No. 62/275,937, filed Jan. 7, 2016, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is a differential compensator to reduce uncertainty in determination of movement of a structural member, the differential compensator comprising: a first probe line comprising a first coefficient of thermal expansion to attach to the structural member and to provide a first combination of displacement of the structural member and a first expansion of the first probe line in response to movement of the structural member and expansion of the first probe line; and a second probe line comprising a second coefficient of thermal expansion that is different than the first coefficient of thermal expansion, the second probe line to attach to the structural member at a position on the structural member proximate to a point of attachment of the first probe line to the structural member and to provide a second combination of displacement of the structural member and second expansion of the second probe line in response to movement of the structural member and expansion of the second probe line.

Further disclosed is a differential compensator to reduce uncertainty in determination of movement of a structural member, the differential compensator comprising: a first probe line comprising a first coefficient of thermal expansion to attach to the structural member and to provide a first combination of displacement of the structural member and a first expansion of the first probe line in response to movement of the structural member and expansion of the first probe line; a second probe line comprising a second coefficient of thermal expansion that is different than the first coefficient of thermal expansion, the second probe line to attach to the structural member at a position on the structural member proximate to a point of attachment of the first probe line to the structural member and to provide a second combination of displacement of the structural member and second expansion of the second probe line in response to movement of the structural member and expansion of the second probe line; a displacement member in mechanical communication with the first probe line and the second probe line, the displacement member to: receive the first combination from the first probe line; receive the second combination from the second probe line; produce a displacement signal comprising the displacement of the structural member, the first expansion of the first probe line, the second expansion of the second probe line, or a combination comprising at least one of the foregoing; an attachment fastener to receive the first probe line and the second probe line and to attach the first probe line and the second probe line to the structural member; a first coupler to receive the first probe line and to mechanically couple the first probe line to the displacement member; and a second coupler to receive the second probe line and to mechanically couple the second probe line to the displacement member.

Also disclosed is a process for determining movement of a structural member, the process comprising: attaching a first probe line to the structural member; attaching a second probe line to the structural member such that the second probe line is proximate to the first probe line at a point of attachment of the first probe line to the structural member; providing a tension on the first probe line and the second probe line from a displacement member such that the second probe line is substantially parallel to the first probe line from the structural member to the displacement sensor; mechanically communicating a first combination from the first probe line to the displacement member, the first combination comprising: a displacement of the structural member in response to movement of the structural member; and a first expansion of the first probe line in response to expansion of the first probe line; mechanically communicating a second combination from the second probe line to the displacement member, the second combination comprising: the displacement of the structural member in response to movement of the structural member; and a second expansion of the second probe line in response to expansion of the second probe line; receiving, by the displacement member, the first combination from the first probe line; receiving, by the displacement member, the second combination from the second probe line; and producing, by the displacement member, a displacement signal in response to receiving the first combination and the second combination to determine the movement of the structural member, the displacement signal comprising the displacement of the structural member, the first expansion of the first probe line, the second expansion of the second probe line, or a combination comprising at least one of the foregoing, wherein, the first probe line comprises a first coefficient of thermal expansion, and the second probe line comprises a second coefficient of thermal expansion that is different than the first coefficient of thermal expansion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a differential compensator that includes a plurality of probe lines that have different coefficients of thermal expansion reduces measurement uncertainty for an electromechanical displacement sensor in mechanical communication with a structural member disposed in a high temperature environment, e.g., a burning room. Advantageously, the coefficients of thermal expansion coefficients are substantially linear with respect to temperature, and the probe lines are located proximate to each other in the same thermal environment, wherein a difference between the measured motion of each probe line is used to determine thermally induced expansion of the probe lines and movement of the structural member. The differential compensator provides a significant (e.g., >90%) reduction in uncertainty of measurements made with electromechanical sensors for structural members disposed in harsh thermal environments that include unknown temporal or spatial variations in temperature such as fire. Surprisingly, the differential compensator passively compensates arbitrary temperature variations.

Figure 1:
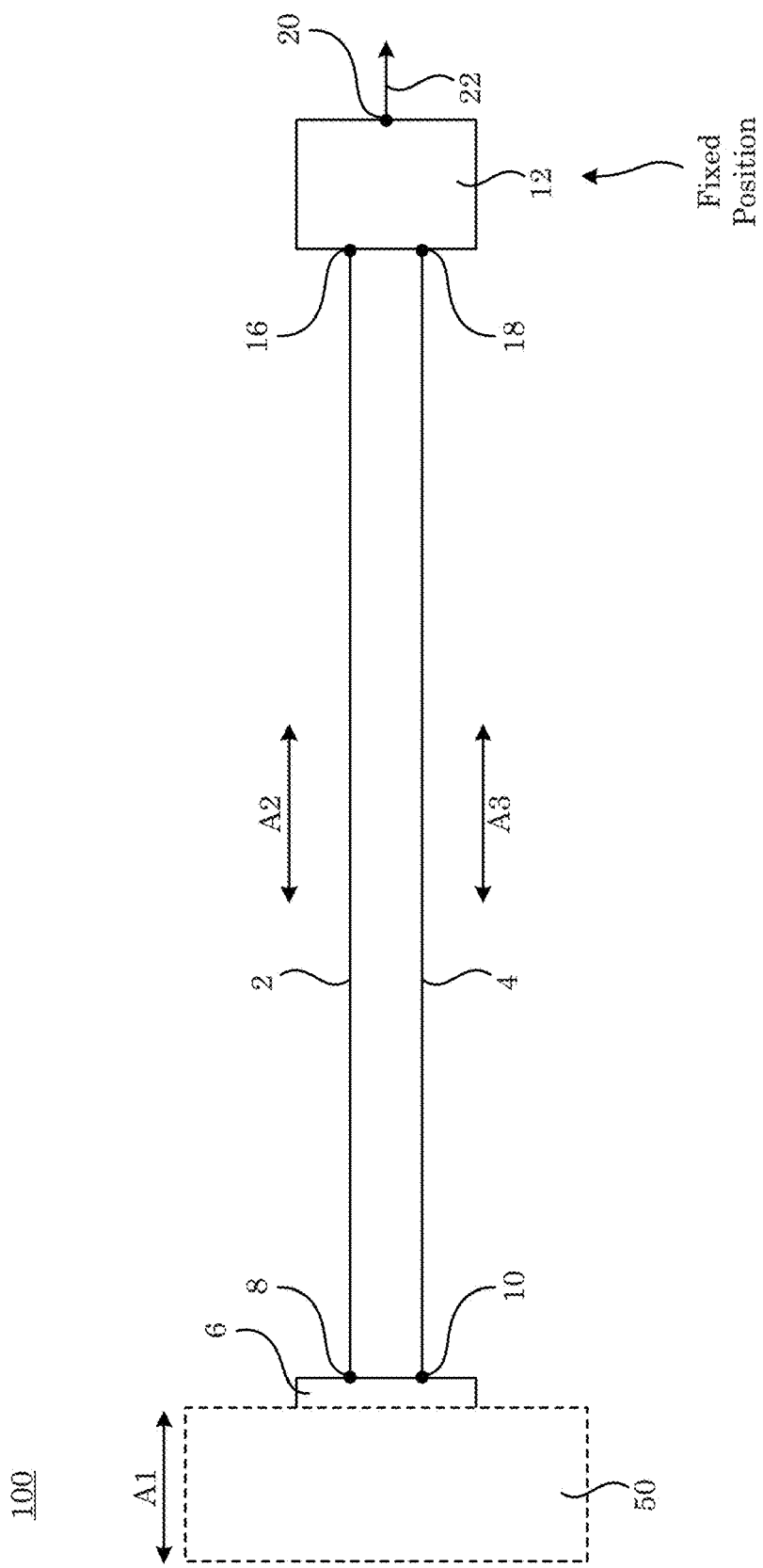
FIG. 1 shows a differential compensator.

In an embodiment, with reference to FIG. 1, differential compensator 100 includes first probe line 2 that includes a first coefficient of thermal expansion to attach to structural member 50 via first point of attachment 8 and to provide a first combination of displacement A1 of structural member 50 and a first expansion A2 of first probe line 2 in response to movement of structural member 50 and expansion of first probe line 2. Additionally, differential compensator 100 includes second probe line 4 that includes a second coefficient of thermal expansion that is different than the first coefficient of thermal expansion of first probe line 2. Second probe line 4 attaches to structural member 50 at second point of attachment 10 at a position on structural member 50 proximate to first point of attachment 8 of first probe line 2 to provide a second combination of displacement A1 of structural member 50 and second expansion A3 of second probe line 4 in response to movement of structural member 50 and expansion of second probe line 4.

Differential compensator 100 further can include displacement member 12 in mechanical communication with first probe line 2 and second probe line 4 via points of attachment (16, 18). Here, displacement member 12 receives the first combination from first probe line 2; receives the second combination from second probe line 4; and produces displacement signal 22 at output terminal 20. Displacement signal 22 includes the displacement A1 of structural member 50, first expansion A2 of first probe line 2, second expansion A3 of second probe line 4, or a combination comprising at least one of the foregoing.

Differential compensator 100 also can include attachment fastener 6 to receive first probe line 2 and second probe line 4. Attachment fastener 6 attaches first probe line 2 and second probe line 4 to structural member 50. In this arrangement, displacement member 12 receives displacement A1 of structural member 50 that is mechanically communicated through attachment fastener 6, first expansion A2 of first probe line 2, and second expansion A3 of second probe line 4 from which displacement member 12 produces displacement signal 22. According to an embodiment, when attached to structural member 50, attachment fastener 6 attaches first probe line 2 and second probe line 4 to structural member 50 such that first probe line 2 is parallel to second probe line 4 from attachment fastener 6 to displacement member 12. Further, displacement member 12 remains in a fixed position as structural member 50 moves during receipt of the first combination from first probe line 2 and the second combination from second probe line 4.

Figure 2:
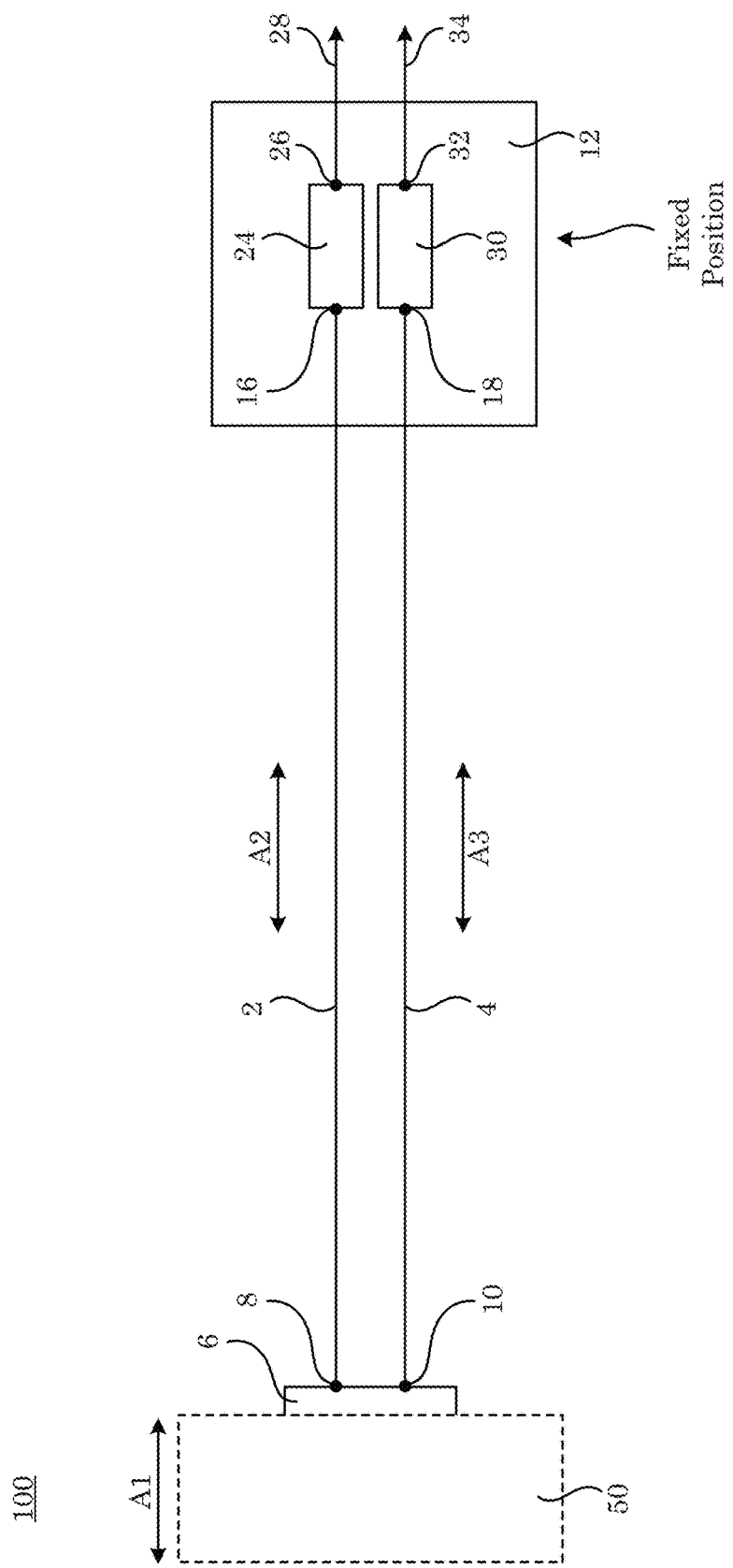
FIG. 2 shows a differential compensator.

In an embodiment, with reference to FIG. 2, displacement member 12 includes first displacement sensor 24 in mechanical communication with first probe line 2, receives the first combination from first probe line 2 via point of attachment 16, and produces first displacement signal 28 at output terminal 26 in response to receipt of the first combination from first probe line 2. Displacement member 2 also includes second displacement sensor 30 in mechanical communication with second probe line 4, receives the second combination from second probe line 4 via point of attachment 18, and produces second displacement signal 34 at output terminal 32 in response to receipt of the second combination from second probe line 4.

Figure 3:
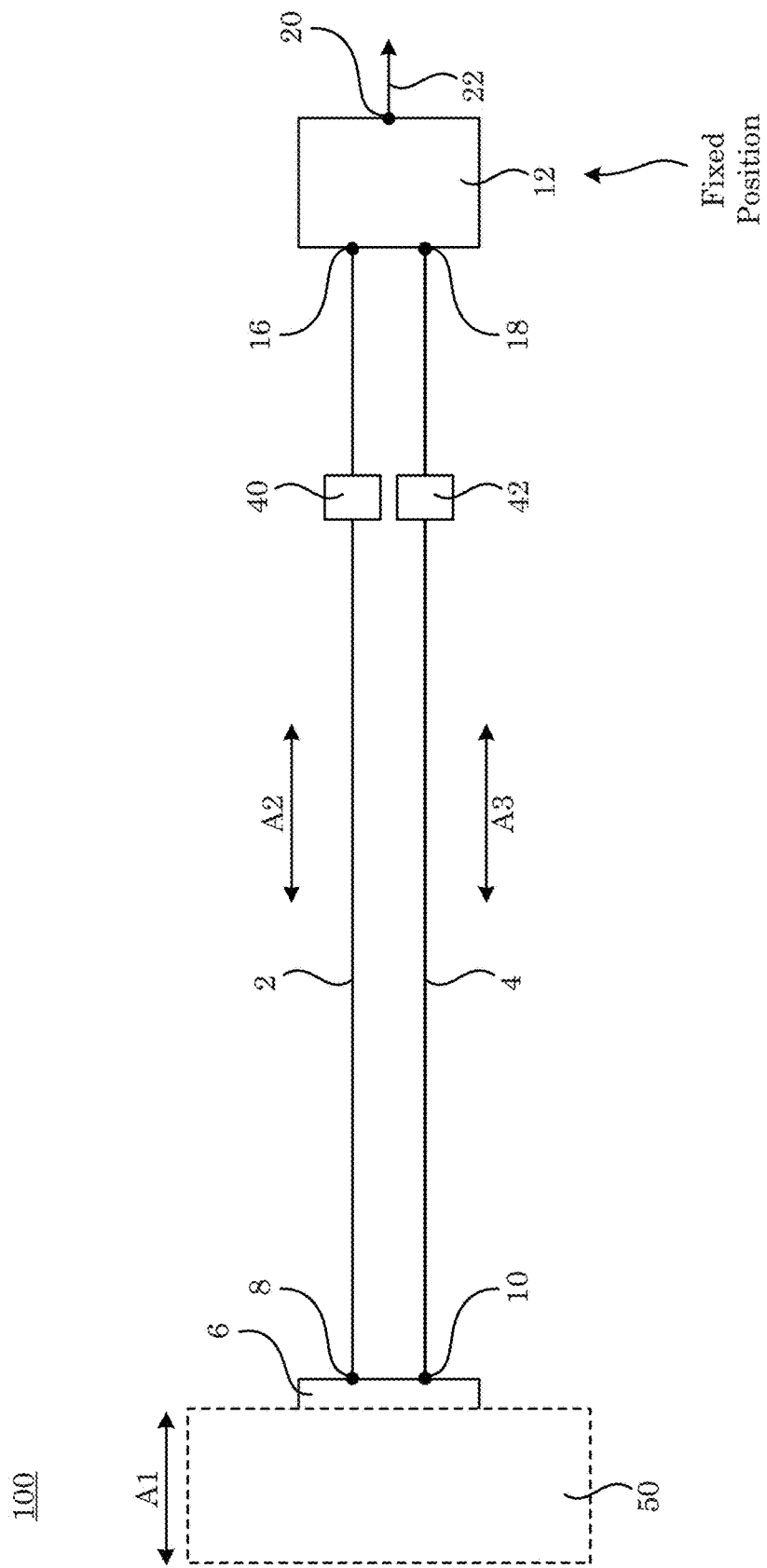
FIG. 3 shows a differential compensator.
Figure 4:
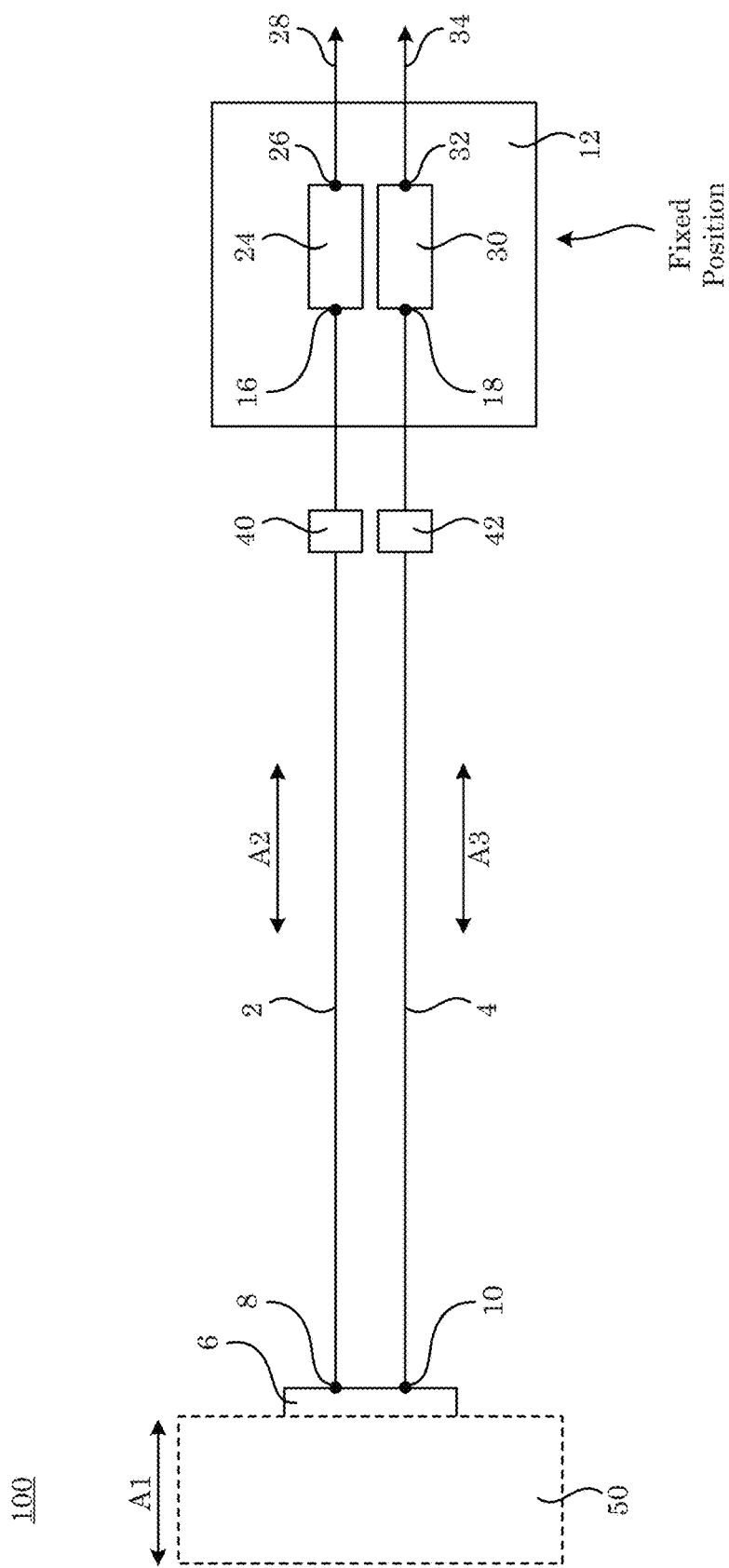
FIG. 4 shows a differential compensator.
Figure 5:
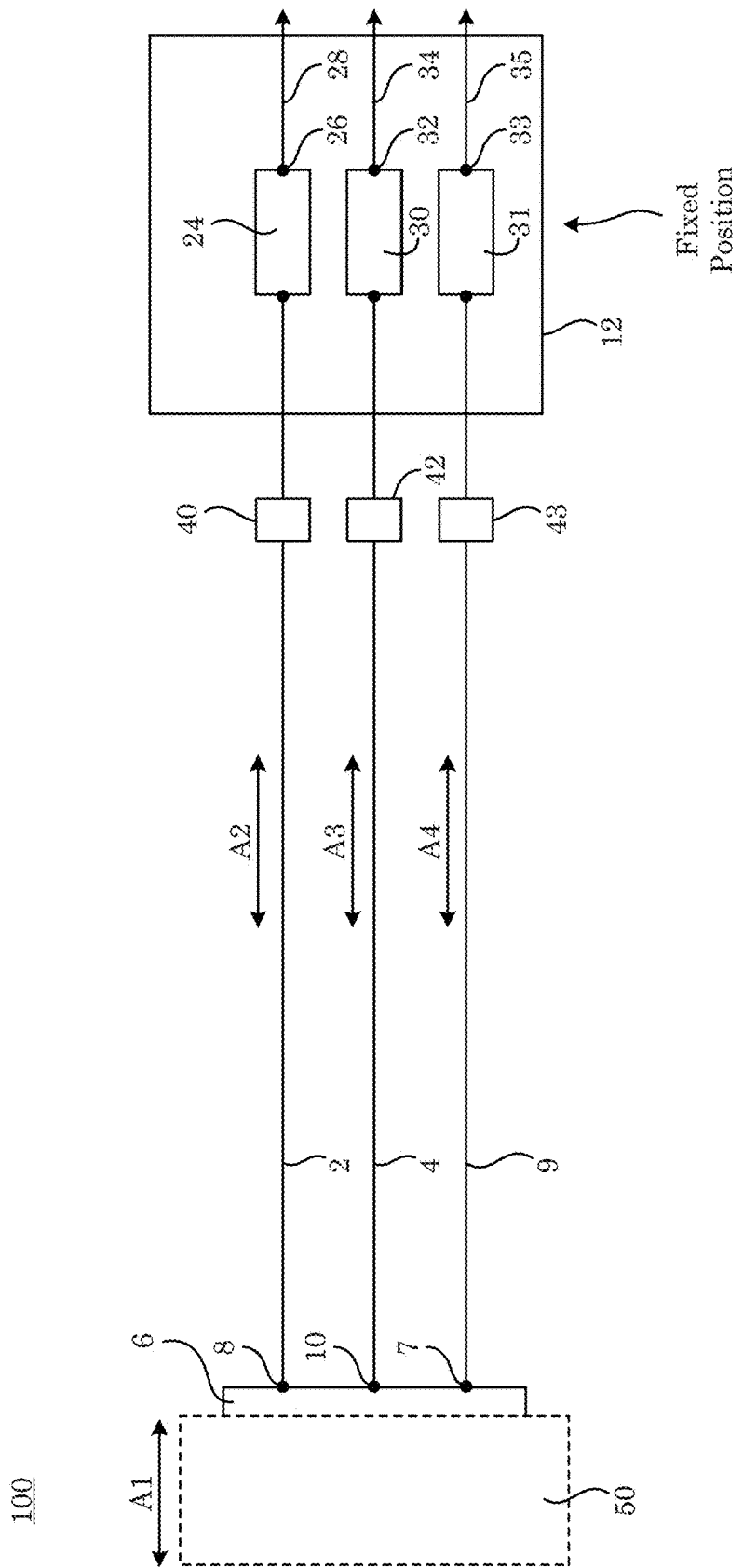
FIG. 5 shows a differential compensator.

In an embodiment, with reference to FIG. 3, differential compensator 100 includes first coupler 40 to receive first probe line 2 and to mechanically couple first probe line 2 to displacement member 12. In this arrangement, first coupler 40 communicates displacement A1 of structural member 50 and first expansion A2 of first probe line 2 to displacement member 12. Further, differential compensator 100 includes second coupler 42 to receive second probe line 4 and to mechanically couple second probe line 4 to displacement member 12. In this arrangement, second coupler 42 communicates displacement A1 of structural member 50 and second expansion A3 of second probe line 4 to displacement member 12. As shown in FIG. 4, it is contemplated that displacement member 12 can include a plurality of displacement sensors (24, 30) in mechanical communication with couplers (40, 42). Differential compensator 100 can include more than two probe lines, e.g., three or more probe lines is shown in FIG. 5, wherein third probe line 9 is connected at third point of attachment 7 to attachment fastener 6 and to displacement sensor 31 via coupler 43. Here, displacement sensor 31 produces their displacement signal 35 at output terminal 33 response to receipt of the third combination of displacement A1 of structural member 50 and third expansion A4 of third probe line 9.

Figure 6:
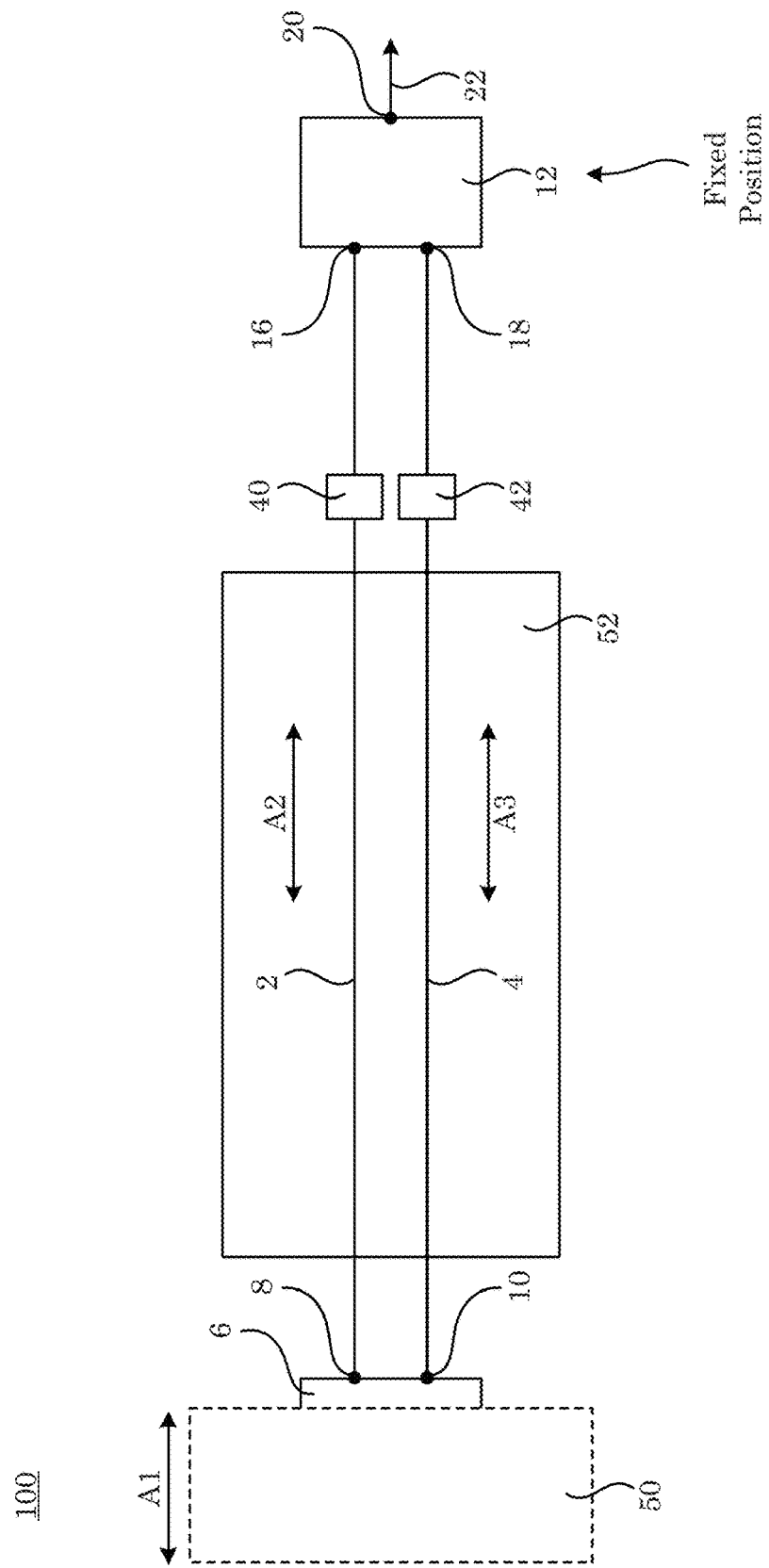
FIG. 6 shows a differential compensator.

According to an embodiment, with reference to FIG. 6, probe lines (2, 4) are disposed in sleeve 52. Sleeve 52 provides physical protection to probe lines (2,4) so that they are less susceptible to mechanical damage during use. Sleeve 52 also ensures that probe lines (2,4) are in proximity to each other and thereby are subject to similar thermal variations along their lengths. Sleeve 52 can extend completely or partly along a length of probe lines (2, 4). Although shown as a single sleeve covering probe lines (2, 4), a plurality of sleeves can be present, wherein each probe line is disposed individually in a sleeve. Sleeve 52 can include temperature-resistance textiles, such as fiberglass or ceramics (Alumina-Borica-Silica, Alumina-Silicate, Silica Carbide) and the like or plastics (polytetrafluoroethylene).

Figure 7:
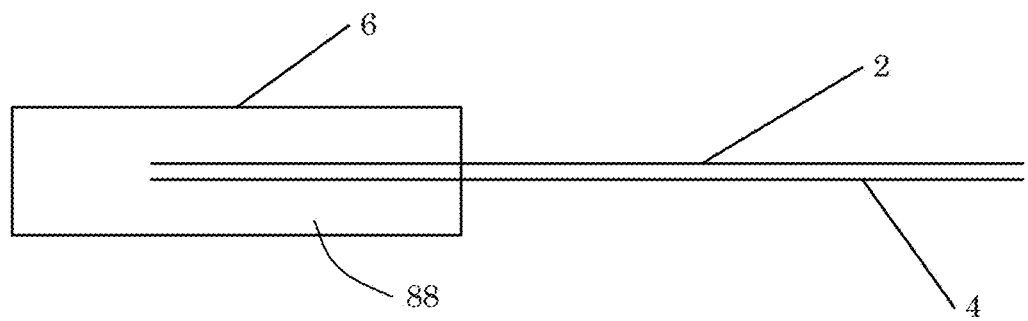
FIG. 7 shows an attachment fastener of a differential compensator.
Figure 8:
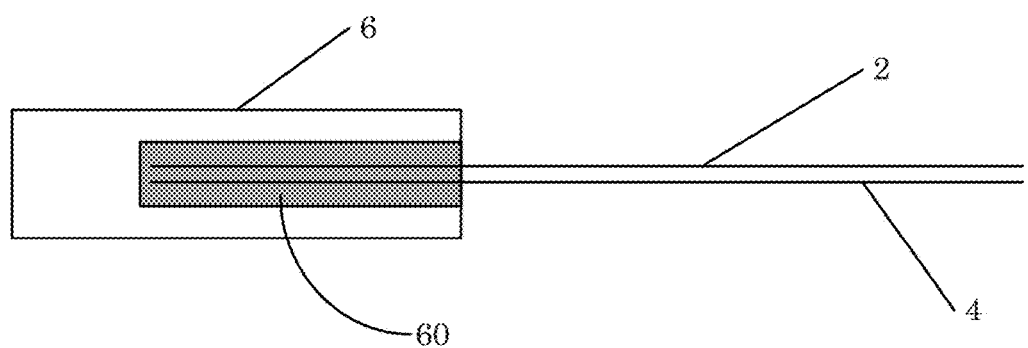
FIG. 8 shows an attachment fastener of a differential compensator.
Figure 9:
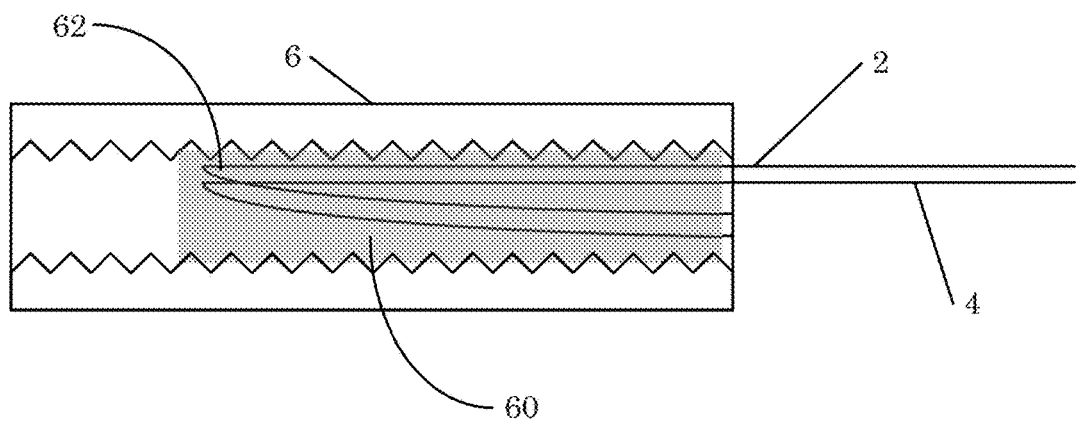
FIG. 9 shows an attachment fastener of a differential compensator.

Differential compensator 100 includes attachment fastener 6 to attach first probe line 2 and second probe line 4 to structural member 50. First probe line 2 and second probe line 4 can be disposed on attachment fastener 6 physically (e.g., mechanical engagement such as interlocking, friction, and the like), chemically (e.g., bonding, alloying and the like), or a combination thereof. In an embodiment, as shown in FIG. 7, first probe line 2 and second probe line 4 are disposed in attachment fastener 6 such that body 88 of attachment fastener 6 encloses and captures terminal ends of first probe line 2 and second probe line 4. Here, attachment fastener 6 can clamp, crimp, bind, or the like first probe line 2 and second probe line 4. In an embodiment, as shown in FIG. 8, first probe line 2 and second probe line 4 are disposed in attachment fastener 6, wherein adhesive 60 bonds terminal ends of first probe line 2 and second probe line 4 to attachment fastener 6. As shown in FIG. 9, attachment member 6 can include a plurality of teeth to engage adhesive 60 that bonds first probe line 2 and second probe line 4 to attachment fastener 6. First probe line 2 and second probe line 4 can be bent proximate to form crooks 62 at their terminal ends to secure first probe line 2 and second probe line 4 in attachment fastener 6.

It is contemplated that structural member 50 is subjected to the same environmental conditions as first probe line 2 and second probe line 4. Here, attachment fastener 6 may not self-compensate its deformation, and attachment fastener 6 can include materials that have thermal and mechanical behavior that is compatible with a temperature in which differential compensator 100 is disposed. Such materials include those with low deformation and that maintain mechanical integrity and do not soften or oxidize under combustion conditions. Further, attachment fastener 6 includes material that does not detach from first probe line 2 and second probe line 4. Exemplary materials for attachment fastener 6 include metals (e.g., steel, stainless steel, nickel chromium alloys, and the like), ceramic (e.g., silicon carbide (SiC), aluminum oxide ($Al_2O_3$), and the like), and the like. Exemplary adhesives 60 include high temperature epoxies, ceramic adhesives, graphite adhesives, and the like.

Differential compensator 100 includes probe lines (e.g., 2, 4). Probe lines (2,4, and the like) are selected for distinct thermal and mechanical properties in a temperature range of interest. The properties can include linear thermal expansion over the temperature range, low creep, and maintenance of mechanical integrity such as resistance to softening or oxidation. In an environment, first probe line 2 and second probe line 4 respectively have the first coefficient of thermal expansion and the second coefficient of thermal expansion that are linear and positive functions of temperature, wherein the first coefficient of thermal expansion of first probe line 2 is different than the second coefficient of thermal expansion of second probe line 4.

Moreover, a structure, a composition, and the first coefficient of thermal expansion of first probe line 2 remains constant from a temperature from $-270°$ C. to $2600°$ C., specifically from $-100°$ C. to $1600°$ C., and more specifically from $0°$ C. to $1400°$ C. Additionally, a structure, a composition, and the second coefficient of thermal expansion of first probe line 4 remain constant from a temperature from $-270°$ C. to $2600°$ C., specifically from $-100°$ C. to $1600°$ C., and more specifically from $0°$ C. to $1400°$ C.

First probe line 2 and second probe line 4 independently include a metal, a glass, a ceramic, or a combination comprising at least one of the foregoing materials. Exemplary materials of probe lines (2, 4) for use in fire environments independently include metal alloys (e.g., alloys that include transition metal elements such as nickel, chromium, aluminum, tungsten, zinc, iron, and the like that include, e.g., nickel-chromium, nickel-chromium-iron, nickel-molybdenum-chromium, and the like), carbides (e.g., silicacarbide), oxides ($Al_2O_3$, $Al_2O_3$—$SiO_2$, $Al_2O_3$—$SiO_2$—$B_2O_3$, and the like), nitrides (e.g., silicon nitride, titanium nitride and the like), and the like.

In differential compensator 100, first probe line 2 and second probe line 4 provide a mechanical link between structural member 50 and displacement member 12. Here, structural member 50 is displaced relative to displacement member 12 (which is in a fixed position) due to a stimulus such as heat from a flame or thermal conduction from a hotter body such as a floor, wall, or the like of a building as well as furnishings or fixtures in the building. Due to absorption of heat, structural member 50 expands and can be displaced toward or away from displacement member 12. The displacement (indicated by "A1" in the accompanying figures, e.g., FIG. 1, of this patent application) is communicated to displacement member 12 through first probe line 2 and second probe line 4 that span a distance between structural member 50 and displacement member 12. First probe line 2 and second probe line 4 can be subjected to a tension force, compression force or combination thereof. Accordingly, first probe line 2 and second probe line 4 independently can be, e.g., a wire, cable, string, a tow of fibers, and the like to bear the tension force. It is contemplated that first probe line 2 and second probe line 4 independently can be a structure to bear the compression force such as, e.g., a rod, a tube, and the like.

A shape of first probe line 2 and second probe line 4 is selected so that displacement of structural member 50 is mechanically communicated from structural member 50 to displacement member 12. In an embodiment, first probe line 2 and second probe line 4 are elongated about a first axis that is orthogonal to a direction of displacement of structural member 50, and first probe line 2 and second probe line 4 have an arbitrary length in dimensions orthogonal to the first axis such as found with wire, cable, and the like. A length of probe lines (2, 4) independently can be from 1 millimeter (mm) to 100 meters (m), specifically from 50 mm to 50 m, and more specifically from 500 mm to 20 m. A diameter of probe lines (2, 4) independently can be from 10 micrometers (μm) to 20 mm, specifically from 100 μm to 5 mm, and more specifically from 500 μm to 2 mm.

Differential compensator 100 includes couplers (40, 42) to attach first probe line 2 and second probe line 4 to displacement member 12. First probe line 2 and second probe line 4 can be disposed on couplers (40, 42) physically (e.g., mechanical engagement such as interlocking, friction, and the like), chemically (e.g., bonding, alloying and the like), or a combination thereof. In an embodiment, first probe line 2 and second probe line 4 are disposed in couplers (40, 42) such that couplers (40, 42) encloses and captures terminal ends of first probe line 2 and second probe line 4. Here, couplers (40, 42) can clamp, crimp, bind, or the like first probe line 2 and second probe line 4. In an embodiment, first probe line 2 and second probe line 4 are disposed in couplers (40, 42), wherein adhesive 60 bonds terminal ends of first probe line 2 and second probe line 4 to couplers (40, 42). Couplers (40, 42) can include a plurality of teeth to engage adhesive 60 that bonds first probe line 2 and second probe line 4 to couplers (40, 42). First probe line 2 and second probe line 4 can be bent proximate to form crooks 62 at their terminal ends to secure first probe line 2 and second probe line 4 in couplers (40, 42).

In some embodiments, couplers (40, 42) are subjected to the same environmental conditions as first probe line 2 and second probe line 4. Here, couplers (40, 42) may not self-compensate its deformation, and couplers (40, 42) can include materials that have thermal and mechanical behavior that is compatible with a temperature in which probe lines (2, 4) are disposed. Such materials include those with low deformation and that maintain mechanical integrity and do not soften or oxidize under combustion conditions. In certain embodiments, couplers (40, 42) are subjected to a different environmental condition from first probe line 2 and second probe line 4. It is contemplated that while first probe line 2 and second probe line 4 subjected to combustion conditions such as flame temperatures or oxidative conditions, couplers (40, 42) are subjected to environmental conditions such as moderate to low temperatures or non-oxidative conditions.

Couplers (40, 42) may not self-compensate its deformation, and couplers (40, 42) can include materials that have thermal and mechanical behavior that is compatible with a temperature in which probe lines (2, 4) are disposed. Such materials include those with low deformation and that maintain mechanical integrity and do not soften or oxidize under combustion conditions. Exemplary materials for couplers (40, 42) include metals (e.g., steel, stainless steel, aluminum, and the like), non-metal (e.g., ceramic, plastic, and the like), and the like. Further, couplers (40, 42) include a material that does not detach from first probe line 2 and second probe line 4.

Differential compensator 100 includes displacement member 12 that attaches to first probe line 2 and second probe line 4 and is in mechanical communication therewith. Displacement member 12 receives the first combination from first probe line 2 and the second combination from second probe line 4. Displacement member 12 preloads first probe line 2 and second probe line 4 with a force. In an embodiment, the force subjected to first probe line 2 and second probe line 4 from displacement member 12 is substantially constant. Displacement member 12 can be an electromechanical displacement sensor, wherein a constant force is provided to probe lines (2, 4), and a displacement signal is produced in response to retraction or extension of probe lines (2, 4) in relation to a fixed position of displacement member 12. According to an embodiment, displacement member 12 includes: a transducer member in mechanical communication with first probe line 2 and second probe line 4 to produce displacement signal 22 in response to receipt of the first combination and the second combination; and a tension member in mechanical communication with first probe line 2 and the second probe line 4 to preload and to maintain a tension that is constant and independently provided to first probe line 2 and second probe line 4 when first probe line 2 and second probe line 4 are attached to structural member 50. It is contemplated that displacement member 12 can include a plurality of displacement sensors (e.g., see FIG. 4) in mechanical communication with probe lines (2, 4). Exemplary displacement members include a cable extension linear position transducer as disclosed in U.S. Pat. Nos. 5,236,144; 5,761,822; 6,154,975; 6,347,462; and 6,609,309 and U.S. patent application Ser. No. 12/026, 792, the disclosure of each of which is incorporated by reference herein in its entirety.

According to an embodiment, displacement member 12 can include a potentiometer in mechanical communication with an element (e.g., a string, rod, or the like) interposed between the potentiometer in probe lines (2, 4) to connect to probe lines (2,4) and to communicate displacement of structural member 50 and expansion of probe lines (2, 4) to displacement member 12). In some embodiments, probe lines (2,4) are physically attached to the potentiometer directly.

In an embodiment, differential compensator 100 attaches to structural member 50 via probe lines (2, 4) to connect to probe lines (2,4) and to communicate displacement of structural member 50 and expansion of probe lines (2, 4) to displacement member 12. Structural member 50 is contemplated to be any solid body to which probe lines (2, 4) can be attached. Exemplary structural members include construction elements such as beams, columns, floors and walls, the physical contents of a structure such as motors and vessels, and the like, or a combination thereof.

Differential compensator 100 can be made by various ways. In an embodiment, a process for making differential compensator 100 includes: providing materials for first probe line 2 and second probe line 4; optionally removing a portion of the material (e.g., cutting) to provide first probe line 2 and second probe line 4 having a selected length, wherein the links can be substantially identical or different; optionally heat treating first probe line 2 and second probe line 4 to decrease strain or material defects; attaching first probe line 2 and second probe line 4 to attachment connector 6; and attaching first probe line 2 and second probe line 4 to displacement member 12. The process also can include attaching first probe line 2 and second probe line 4 to couplers (40, 42) that are attached to displacement member 12.

In the process, heat treating first probe line 2 and second probe line 4 includes heating probe lines (2, 4) to a temperature at which probe lines (2, 4) are exposed during use of differential compensator 100. In an embodiment, heat treating is performed in environment in which probe lines (2, 4) are not subject to oxidation. Here, the environment is provided by disposing probe lines (2, 4) in a vacuum chamber that is evacuated or filled with inert gases in an absence of a gas or condensed phase matter that oxidizes probe lines (2, 4) to avoid oxidation during heat treating. Further, probe lines (2, 4) can be cooled at a moderate rate to avoid oxidation after heat treating.

In the process, attaching first probe line 2 and second probe line 4 to attachment connector 6 can be accomplished by the adhering probe lines (2, 4) to attachment connector 6 such as by wetting probe lines (2, 4) with water (e.g., for ceramic fiber tows for probe lines (2, 4)), bending a crook in the terminal ends of probe lines (2, 4), inserting the crooks into attachment connector 6 (e.g., a threaded coupling nut), and disposing a high-temperature ceramic adhesive into an interior volume of attachment connector 6. Attachment connector 6 can be vibrated, e.g., ultrasonically, to remove gas bubbles from the adhesive, and the adhesive can be cured to fixedly disposed probe lines (2, 4) to attachment connector 6. Free ends of probe lines (2, 4) can be attached to couplers (40, 42), e.g., with an adhesive such as a glue or epoxy.

Figure 10:
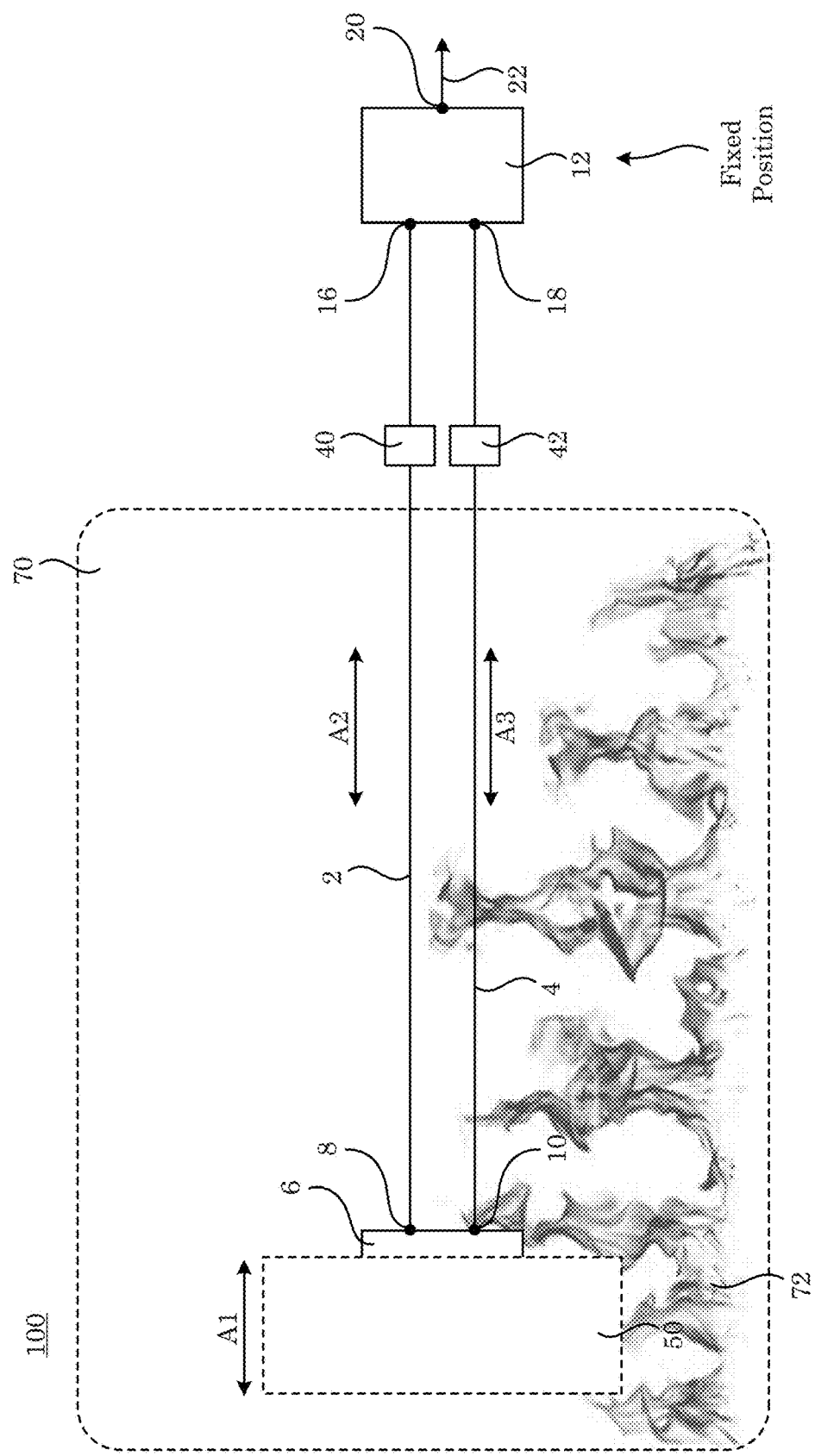
FIG. 10 shows a differential compensator disposed in a thermal field.

The processes and articles herein have numerous beneficial uses, including a process for determining movement of a structural member. In an embodiment, the process for determining movement of a structural member includes: attaching first probe line 2 to structural member 50; attaching second probe line 4 to structural member 50 such that second probe line 4 is proximate to first probe line 2 at point of attachment 8 of first probe line 2 to structural member 50; providing a tension on first probe line 2 and second probe line 4 from displacement member 12 such that second probe line 4 is substantially parallel to first probe line 2 from structural member 50 to displacement member 12; mechanically communicating a first combination from first probe line 2 to displacement member 12, the first combination including: a displacement of structural member 50 in response to movement of structural member 50; and a first expansion of first probe line 2 in response to expansion of first probe line 2; mechanically communicating a second combination from second probe line 4 to displacement member 50, the second combination including: the displacement of structural member 50 in response to movement of structural member 50; and a second expansion of second probe line 4 in response to expansion of second probe line 4; receiving, by displacement member 50, the first combination from first probe line 2; receiving, by displacement member 12, the second combination from second probe line 4; and producing, by displacement member 50, displacement signal 22 in response to receiving the first combination and the second combination to determine the movement of structural member 50. Displacement signal 22 can include the displacement of structural member 50, the first expansion of first probe line 2, the second expansion of second probe line 4, or a combination comprising at least one of the foregoing. Here, first probe line 2 can include a first coefficient of thermal expansion, and second probe line 4 can include a second coefficient of thermal expansion that is different than the first coefficient of thermal expansion. As shown in FIG. 10, differential compensator 100 can be attached to structural member 50 such that a portion of first probe line 2, a portion of second probe line 4, attachment connector 6, and structural member 50 are disposed in a thermal field 70 that includes flames 72 or other elevated temperature heat source.

In the process for determining movement of a structural member, attaching first probe line 2 and second probe line 4 to structural member 50 can include attaching attachment connector 62 structural member 5 via physical attachment (e.g., bolting, clamping, welding, and the like) or chemical attachment (e.g., bonding, adhering, and the like).

The process can include securing displacement member 12 to a fixed point of reference so that displacement member 12 does not move and can monitor the movement of structural member 50. Securing displacement member 12 can include attaching displacement member 12 to an immobile body such as a non-moving platform mechanically (e.g., by bolting, clamping, welding, and the like) or chemically.

Figure 11:
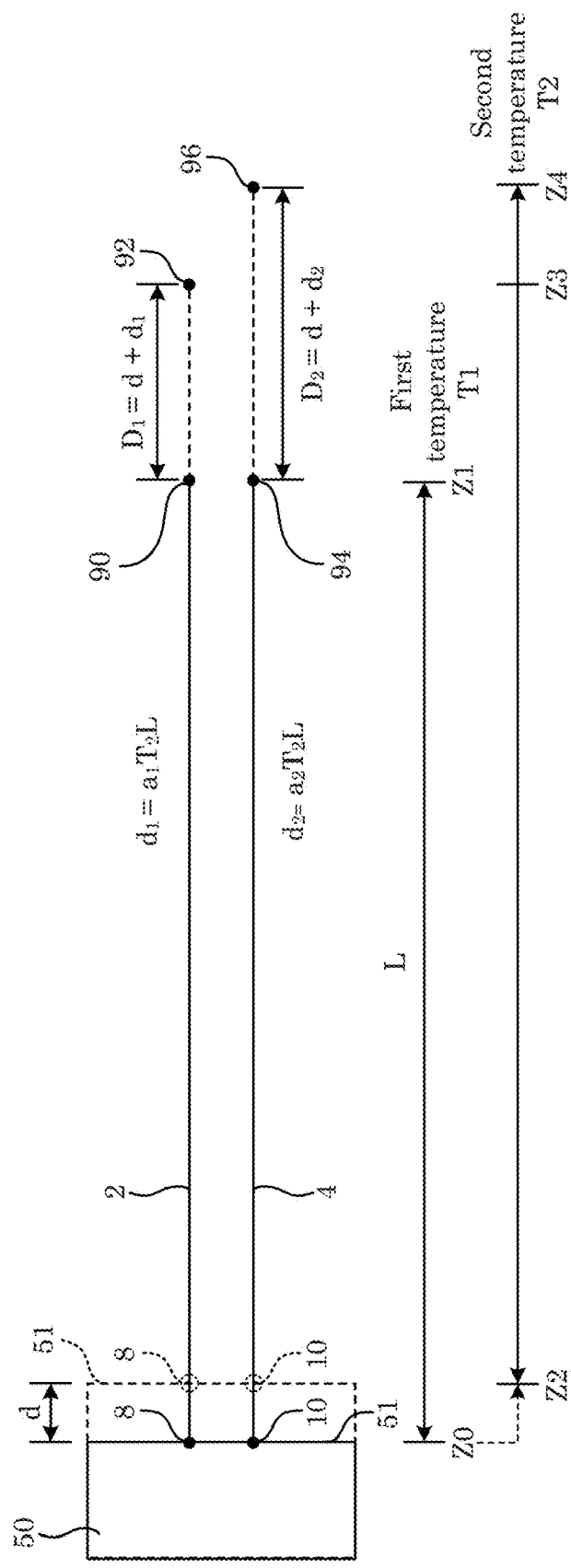
FIG. 11 shows a linear expansion of a differential compensator in response to being subjected to a thermal field.

With reference to FIG. 11, at first temperature T1 (relative to second temperature T2, wherein T1 <T2), structural member 50 includes surface 51 located at position Z0 and to which first probe line 2 is attached at point of attachment 8. First probe line 2 has length L and extends from point 8 at position Z0 to point 90 at position Z1. Second probe line 4 is attached to surface 51 of structural member 50 at point of attachment 10, has length L, and extends from point 10 at position Z0 to point 94 at position Z1. It is contemplated that a length of first probe line 2 and second probe line 4 can be different.

In a presence of the heat source, e.g., flames 72, that provides second temperature T2, surface 51 of structural member 50 is displaced by distance d such that structural member 50 appears to have moved by distance D with respect to displacement member 12 attached to first probe line 2 and second probe line 4. Also, first probe line 2 and second probe line 4 expand due to absorption of heat from the heat source. Because first probe line 2 and second probe line 4 have different coefficients of thermal expansion, i.e., respectively first coefficient of thermal expansion a1 and second coefficient of thermal expansion a2, first probe line 2 lengthens by a different amount than second probe line 4. That is, first probe line 2 expands by first expansion d1 in a presence of second temperature T2 such that d1=a1*T2*L. Similarly, second probe line 4 expands by second expansion d2 in the presence of second temperature T2 such that d2=a2*T2*L. Accordingly, the end of first probe line 2 attached to displacement member 12 is displaced from point 90 to point 92 by distance D1=d+d1, and the end of second probe line 4 attached to displacement member 12 is displaced from point 94 to point 96 by distance D2=d+d2.

In the process, determining the movement or displacement of structural member 50 can be accomplished from formula 1.

$$d = \frac{D1 - \frac{a1}{a2} \cdot D2}{1 - \frac{a1}{a2}} \quad (1)$$

Differential compensator 100 has numerous beneficially and advantageous properties. Beneficially, differential compensator 100 provides measurement of thermal expansion in probe lines that interconnect displacement members to structural members. Beneficially, the articles and methods herein reduce uncertainty in determinations of properties discussed to less than 1 mm/m at various temperatures.

Differential compensator 100 can be operated over many temperatures such as a temperature over which probe lines maintain their integrity and linearity of thermal expansion with respect to temperature. In an embodiment, ceramic fibers are used for probe lines. Ceramic fibers can include silicon-carbide and aluminum-oxide fibers for temperatures in excess of 1000° C.

Accurate and reliable measurements of the displacement of structural member 50 in fire tests provide understanding of a physical response of structural member 50 to elevated temperatures and stresses. Differential compensator 100 overcomes challenges involved with measuring displacement of structural member 50 in large-scale tests where the displacements to be measured may be located within a heated test zone. Conditions can include time-varying gas temperatures, e.g., from 20° C. to 1400° C., sustained structural member temperatures up to 750° C., as well as flame and soot which obscure visibility.

The articles and processes herein are illustrated further by the following Examples, which are non-limiting.

Example 1

Determination of displacement error for a differential compensator.

Figure 12:
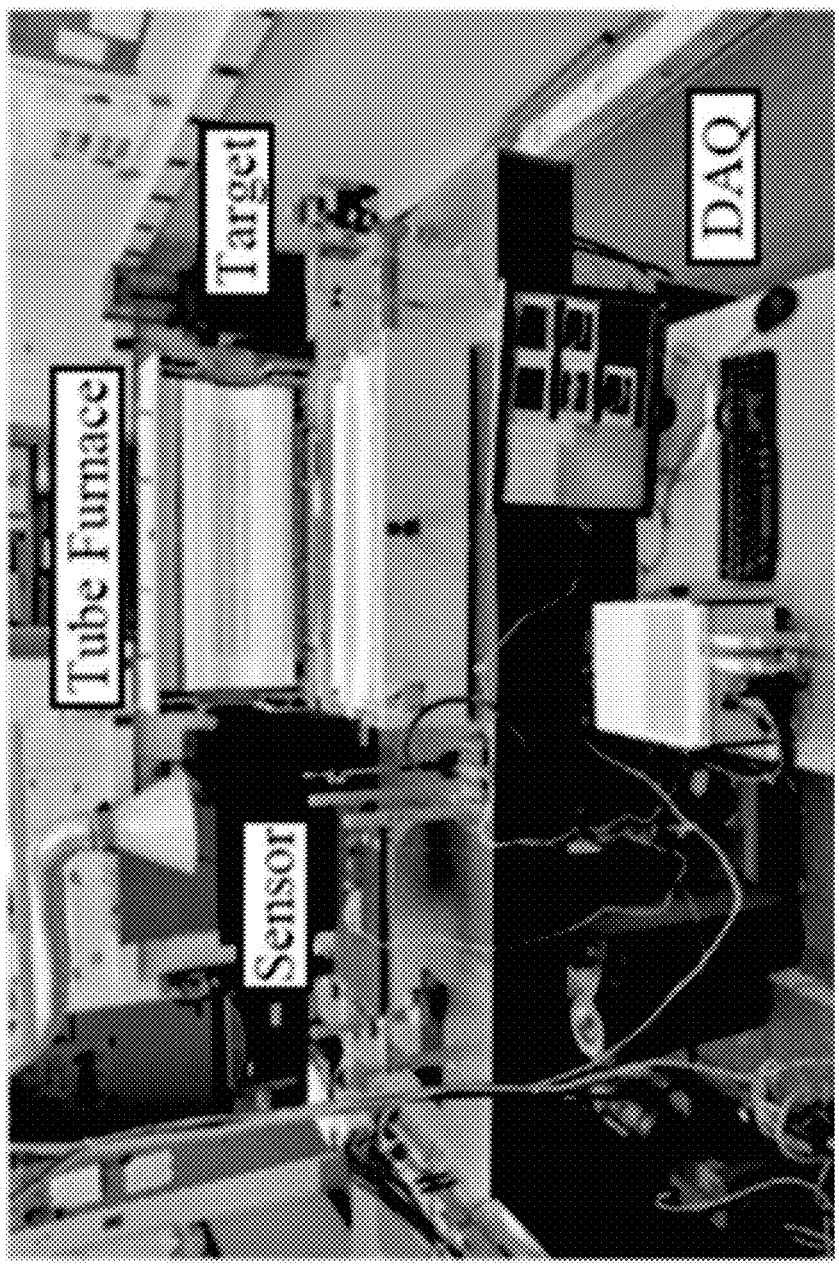
FIG. 12 shows a laboratory configuration that includes a differential compensator connected to a structural member.

FIG. 12 shows an arrangement in which a differential compensator was constructed by spanning a first probe line made of aluminum oxide in proximity to a second probe line made of silica carbide between a displacement member (Sensor) and a structural member (Target) through a heat source (Tube Furnace). In this manner, the elongation of the probe lines due to heating is mechanically communicated to the displacement member. The span length between the displacement member and the structural member was approximately 1.5 meters. The diameter of each of the probe line was approximately 1 millimeter. The length of the probe lines inside of the tube furnace was approximately 0.75 meters. The displacement member consisted of two linear potentiometers; one connected to the first probe line and the other to the second probe line. Since in the example the connections between the probe lines and the displacement member and the probe lines and the structural member were not heated, the connections were made using friction (clamping) or adhesion with low-temperature epoxy.

The displacement member was electrically connected to a data acquisition system (DAQ) for acquisition of the displacement signal from the displacement member. Each linear potentiometer in the displacement member could independently measure displacement of the probe line to which it was attached. In this example, the linear potentiometers were fixed in space relative to the structural member and the structural member was stationary. Thus the displacement registered at the displacement member could be used to determine the displacement error (relative to zero displacement of the stationary target) of this displacement compensator.

Figure 13:
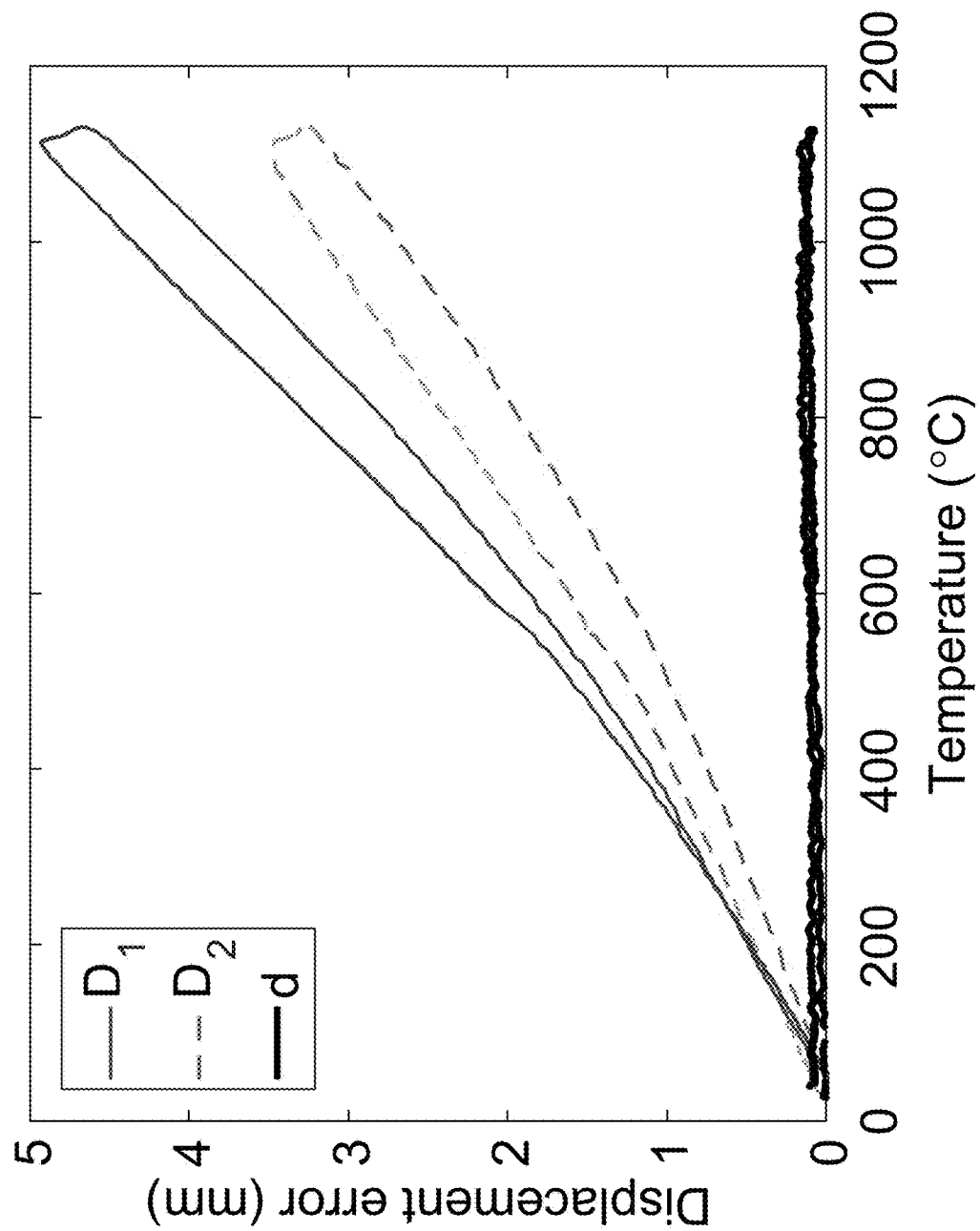
FIG. 13 plots the response of a differential compensator (d) in response to being subjected to a thermal field along with response of uncompensated first probe line ($D_1$) and second probe line ($D_2$) subjected to the same thermal field.

During testing the temperature in the tube furnace was raised from 23° C. to 1100° C. over several minutes and then cooled to 23° C. over several hours. The displacements measured by the linear potentiometers in the displacement member for the first and second probe lines were designated D1 and D2, respectively. FIG. 13 shows the resulting displacements as a function of furnace temperature. The hysteresis (looping) exhibited in the curve was in part due to the experimental setup and in part due to the fact that these probe lines were not heat treated prior to testing to reduce material creep. The displacement error of the displacement compensator (d) established using formula 1 is shown in FIG. 13 for comparison. The hysteresis induced by the test setup as well as the heating-induced error in the probe lines is significantly reduced for curve d. This beneficial result of the displacement compensator to reduce displacement error in the present of heating can be shown to be repeatable and insensitive to variations to the heating profile of the furnace.

Example 2

Determination of displacement of steel beam heated by fire.

A differential compensator was constructed by spanning a first probe line made of aluminum oxide in proximity to a second probe line made of silica carbide between a displacement member and a structural member (Beam). The span length between the displacement member and the structural member was approximately 1 meter. The diameter of each of the probe line was approximately 1 millimeter. The displacement member consisted of two linear potentiometers; one connected to the first probe line and the other to the second probe line. In this example the connection between the probe lines and the structural member was heated, so the connection was made using a combination of adhesion using high-temperature ceramic adhesive and interlocking of the connector and the probe lines.

Figure 14:
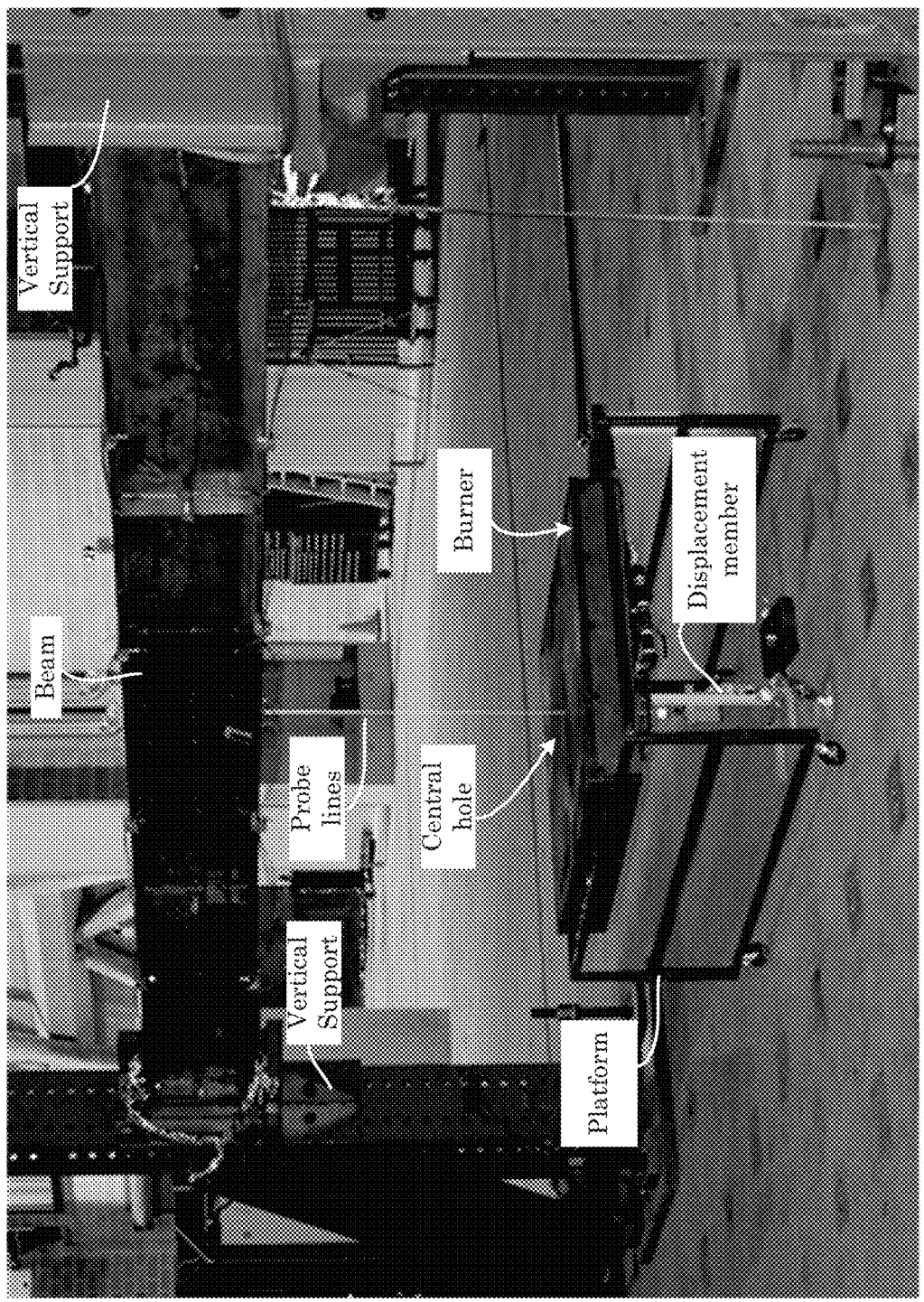
FIG. 14 shows a laboratory configuration that includes a differential compensator connected to a structural member.

FIG. 14 show an arrangement in which a beam (particularly, an I-beam) made of steel was disposed horizontally above a floor of a combustion test facility. Here, the ends of the beam were attached to vertical support structures such that the beam was positioned at a height of 1.5 meters above the floor. A natural gas burner was positioned beneath the beam. The burner included a platform that had a central hole and that served as a combustion burner at its top surface. The differential compensator was attached to the floor of the combustion facility and the beam, wherein the displacement member was attached below the burner and shielded from radiant energy from flames provided by the combustion burner so that the displacement member remained less than 50° C. during testing. The attachment fastener was attached to the beam such that the probe lines were parallel to one another and extended from the attachment fastener at the beam through a gap in the center of the burner to the displacement member.

The displacement member was electrically connected to a data acquisition system (DAQ) for acquisition of the displacement signal from the displacement member. In this arrangement, the beam can be displaced toward the floor while the displacement member is maintained in a constant position without moving relative to the floor. In this manner, displacement of the beam and expansion of the probe lines due to a presence of the flame from the combustion burner is mechanically communicated to the displacement member.

Figure 15:
FIG. 15 shows a laboratory configuration that includes a differential compensator connected to a structural member during a fire test.
Figure 16:
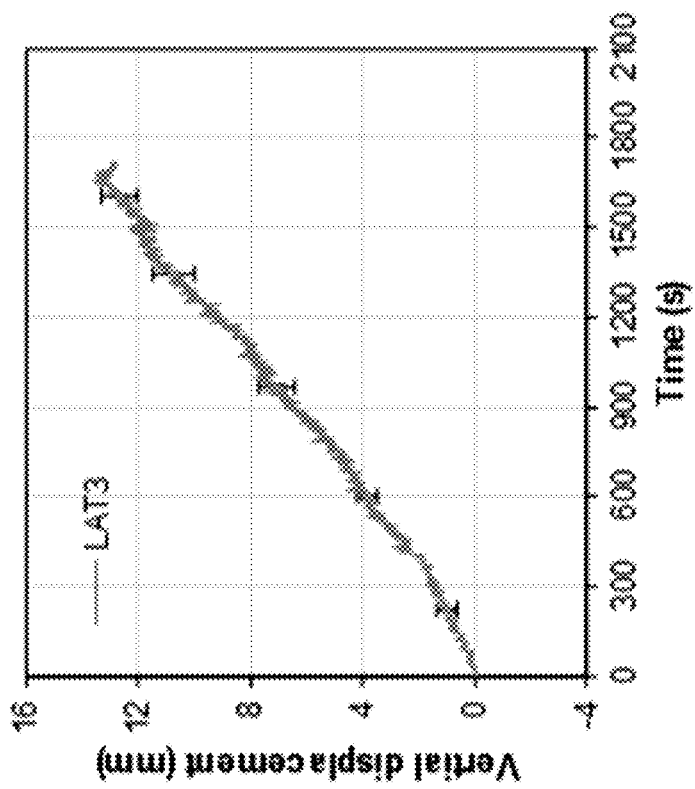
FIG. 16 plots the response of a differential compensator (vertical displacement) during a fire test.

FIG. 15 show a fire test where the burner was ignited and heated the beam from below with an approximately 500 kW diffusion fire. The beam was heated to over 500° C. which caused it to deform in the vertical direction; toward the displacement compensator. The probe lines were engulfed in flame and the gas temperature around the probe lines exceeded 1000° C. The vertical displacement of the beam was measured by the displacement compensator as shown in FIG. 16. The displacement compensator significantly reduced the error of the displacement measurement caused by the influence of thermal expansion of the probe lines.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A differential compensator to reduce uncertainty in determination of movement of a structural member, the differential compensator comprising:
a first probe line comprising a first coefficient of thermal expansion to attach to the structural member and to provide a first combination of displacement of the structural member and a first expansion of the first probe line in response to movement of the structural member and expansion of the first probe line; and
a second probe line comprising a second coefficient of thermal expansion that is different than the first coefficient of thermal expansion, the second probe line to attach to the structural member at a position on the structural member proximate to a point of attachment of the first probe line to the structural member and to provide a second combination of displacement of the structural member and second expansion of the second probe line in response to movement of the structural member and expansion of the second probe line.

2. The differential compensator of claim 1, further comprising:
a displacement member in mechanical communication with the first probe line and the second probe line, the displacement member to:
receive the first combination from the first probe line;
receive the second combination from the second probe line; and
produce a displacement signal comprising the displacement of the structural member, the first expansion of the first probe line, the second expansion of the second probe line, or a combination comprising at least one of the foregoing.

3. The differential compensator of claim 2, wherein the displacement member comprises:
a first displacement sensor in mechanical communication with the first probe line to receive the first combination from the first probe line and to produce a first displacement signal; and
a second displacement sensor in mechanical communication with the second probe line to receive the second combination from the second probe line and to produce a second displacement signal.

4. The differential compensator of claim 2, further comprising:
a first coupler to receive the first probe line and to mechanically couple the first probe line to the displacement member.

5. The differential compensator of claim 4, further comprising:
a second coupler to receive the second probe line and to mechanically couple the second probe line to the displacement member.

6. The differential compensator of claim 2, wherein the displacement member comprises:
a transducer member in mechanical communication with the first probe line and the second probe line to produce the displacement signal in response to receipt of the first combination and the second combination; and
a tension member in mechanical communication with the first probe line and the second probe line to preload and to maintain a tension that is constant and independently provided to the first probe line and the second probe line when the first probe line and the second probe line are attached to the structural member.

7. The differential compensator of claim 1, further comprising:
an attachment fastener to receive the first probe line and the second probe line and to attach the first probe line and the second probe line to the structural member.

8. The differential compensator of claim 7, wherein, when attached to the structural member, the attachment fastener attaches the first probe line and the second probe line the structural member such that the first probe line is parallel to the second probe line.

9. The differential compensator of claim 8, further comprising:
a displacement member in mechanical communication with the first probe line and the second probe line, the displacement member to:
receive the first combination from the first probe line;
receive the second combination from the second probe line; and
produce a displacement signal comprising the displacement of the structural member, the first expansion of the first probe line, the second expansion of the second probe line, or a combination comprising at least one of the foregoing; and
remain in a fixed position as the structural member moves during receipt of the first combination from the first probe line and the second combination from the second probe line.

10. The differential compensator of claim 1, wherein the first coefficient of thermal expansion and the second coefficient of thermal expansion are positive functions of temperature.

11. The differential compensator of claim 10, wherein a structure, a composition, and the first coefficient of thermal expansion of the first probe line remain constant from a temperature from −100° C. to 1500° C., and
a structure, a composition, and the first coefficient of thermal expansion of the first probe line remain constant from a temperature from −100° C. to 1500° C.

12. The differential compensator of claim 11, wherein the first probe line and the second probe line independently comprise a metal, a glass, a ceramic, or a combination comprising at least one of the foregoing materials.

13. A differential compensator to reduce uncertainty in determination of movement of a structural member, the differential compensator comprising:
a first probe line comprising a first coefficient of thermal expansion to attach to the structural member and to provide a first combination of displacement of the structural member and a first expansion of the first probe line in response to movement of the structural member and expansion of the first probe line;
a second probe line comprising a second coefficient of thermal expansion that is different than the first coefficient of thermal expansion, the second probe line to attach to the structural member at a position on the structural member proximate to a point of attachment of the first probe line to the structural member and to provide a second combination of displacement of the structural member and second expansion of the second probe line in response to movement of the structural member and expansion of the second probe line;

a displacement member in mechanical communication with the first probe line and the second probe line, the displacement member to:
  receive the first combination from the first probe line;
  receive the second combination from the second probe line;
  produce a displacement signal comprising the displacement of the structural member, the first expansion of the first probe line, the second expansion of the second probe line, or a combination comprising at least one of the foregoing;

an attachment fastener to receive the first probe line and the second probe line and to attach the first probe line and the second probe line to the structural member;

a first coupler to receive the first probe line and to mechanically couple the first probe line to the displacement member; and a second coupler to receive the second probe line and to mechanically couple the second probe line to the displacement member.

14. The differential compensator of claim 13, wherein the displacement member comprises:
  a first displacement sensor in mechanical communication with the first probe line to receive the first combination from the first probe line and to produce a first displacement signal; and
  a second displacement sensor in mechanical communication with the second probe line to receive the second combination from the second probe line and to produce a second displacement signal,
  the displacement signal comprising the first displacement signal and the second displacement signal.

15. The differential compensator of claim 13, wherein the first coefficient of thermal expansion and the second coefficient of thermal expansion are linear and positive functions of temperature;
  a structure, a composition, and the first coefficient of thermal expansion of the first probe line remain constant from a temperature from −100° C. to 1500° C., and
  a structure, a composition, and the second coefficient of thermal expansion of the second probe line remain constant from a temperature from −100° C. to 1500° C.

16. The differential compensator of claim 13, wherein the displacement member comprises:
  a transducer member in mechanical communication with the first probe line and the second probe line to produce the displacement signal in response to receipt of the first combination and the second combination; and
  a tension member in mechanical communication with the first probe line and the second probe line to preload and to maintain a tension that is constant and independently provided to the first probe line and the second probe line when the first probe line and the second probe line are attached to the structural member.

17. The differential compensator of claim 16, wherein, when attached to the structural member, the attachment fastener attaches the first probe line and the second probe line the structural member such that the first probe line is parallel to the second probe line, and
  the displacement member remains in a fixed position as the structural member moves during receipt of the first combination from the first probe line and the second combination from the second probe line.

18. A process for determining movement of a structural member, the process comprising:
  attaching a first probe line to the structural member;
  attaching a second probe line to the structural member such that the second probe line is proximate to the first probe line at a point of attachment of the first probe line to the structural member;
  providing a tension on the first probe line and the second probe line from a displacement member such that the second probe line is substantially parallel to the first probe line from the structural member to the displacement member;
  mechanically communicating a first combination from the first probe line to the displacement member, the first combination comprising:
    a displacement of the structural member in response to movement of the structural member; and
    a first expansion of the first probe line in response to expansion of the first probe line;
  mechanically communicating a second combination from the second probe line to the displacement member, the second combination comprising:
    the displacement of the structural member in response to movement of the structural member; and
    a second expansion of the second probe line in response to expansion of the second probe line;
  receiving, by the displacement member, the first combination from the first probe line;
  receiving, by the displacement member, the second combination from the second probe line; and
  producing, by the displacement member, a displacement signal in response to receiving the first combination and the second combination to determine the movement of the structural member, the displacement signal comprising the displacement of the structural member, the first expansion of the first probe line, the second expansion of the second probe line, or a combination comprising at least one of the foregoing,
  wherein, the first probe line comprises a first coefficient of thermal expansion, and
  the second probe line comprises a second coefficient of thermal expansion that is different than the first coefficient of thermal expansion.

19. The process for determining movement of a structural member of claim 18, wherein the first coefficient of thermal expansion and the second coefficient of thermal expansion are positive functions of temperature.

20. The process for determining movement of a structural member of claim 18, wherein a structure, a composition, and the first coefficient of thermal expansion of the first probe line remain constant from a temperature from −100° C. to 1500° C., and
  a structure, a composition, and the first coefficient of thermal expansion of the first probe line remain constant from a temperature from −100° C. to 1500° C.

* * * * *